No. 774,017. PATENTED NOV. 1, 1904.
E. WULFF.
THROWING ANIMALS FOR TAKING DEATH LEAPS.
APPLICATION FILED APR. 29, 1904.
NO MODEL. 2 SHEETS—SHEET 1.

Witnesses
George G. Schoenlank
Thomas Kirkpatrick

Inventor
Edward Wulff
by Hran Dedenreich
Attorney

No. 774,017. PATENTED NOV. 1, 1904.
E. WULFF.
THROWING ANIMALS FOR TAKING DEATH LEAPS.
APPLICATION FILED APR. 29, 1904.
NO MODEL. 2 SHEETS—SHEET 2.

Witnesses
George G. Schoenlank
Thomas Kirkpatrick

Inventor
Edward Wulff
by H. van Dedem
Attorney

No. 774,017. Patented November 1, 1904.

UNITED STATES PATENT OFFICE.

EDWARD WULFF, OF BRUSSELS, BELGIUM.

THROWING ANIMALS FOR TAKING DEATH LEAPS.

SPECIFICATION forming part of Letters Patent No. 774,017, dated November 1, 1904.

Application filed April 29, 1904. Serial No. 205,640. (No model.)

*To all whom it may concern:*

Be it known that I, EDWARD WULFF, circus proprietor, a subject of the German Emperor, residing at 10 Rue du Moniteur, Brussels, Belgium, have invented a new and useful Improvement in Throwing Animals for Taking a Death Leap; and I do hereby declare the following to be a full, clear, and exact description of the same.

The object of my present invention is to provide an improved apparatus whereby living animals—such as horses, elephants, monkeys, &c.—are readily thrown into the space for the purpose of causing same to take a death leap or so-called "*salto mortale.*"

Another object of my invention is to so construct the throwing apparatus that the projecting force thereof does not act on the legs of the animals, said projecting force being applied on the body proper of the animal to be thrown.

With these and other objects in view my invention consists of the construction, arrangement, and combination of parts fully described hereinafter and specifically pointed out in the appended claims, reference being had to the accompanying drawings, wherein—

Figure 1:
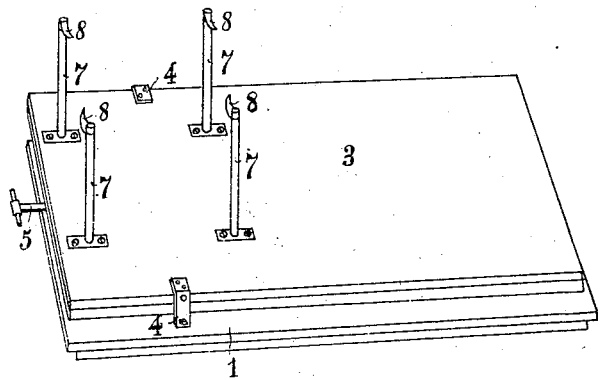
Figure 2:
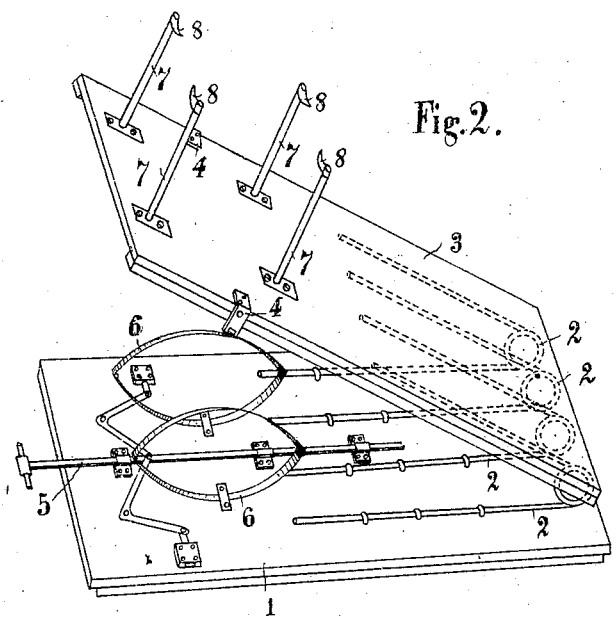
Figure 3:
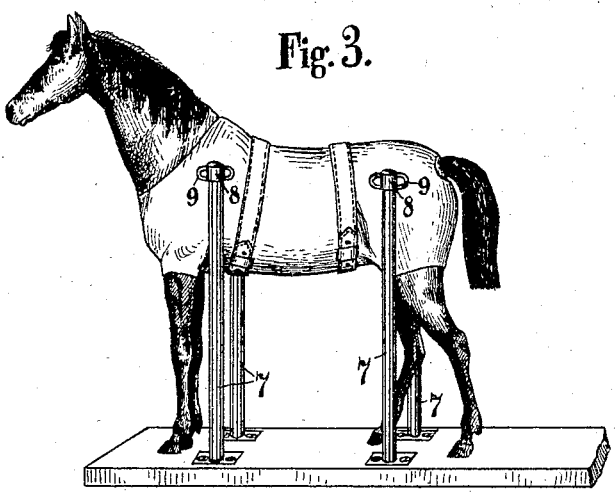
Figure 4:
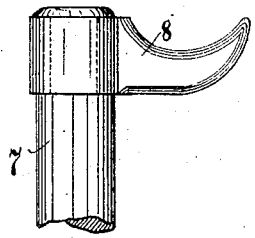

Figure 1 is a perspective view of the apparatus in operative position ready for the throw of an animal. Fig. 2 shows a similar view of the apparatus released. Fig. 3 is an enlarged side view of same with an animal in position to be thrown. Fig. 4 is a detail view of the yoking-hooks.

Like numerals refer to like parts throughout all the views.

Referring more particularly to the drawings, 1 represents a solid stationary base, and 3 a movable throwing-plate connected with said base by means of suitable springs 2 and provided with lateral slotted extensions 4, adapted to be engaged by suitable lever-arms operated through the agency of the handle-lever 5 for the purpose of securing the throwing-plate 3 in its depressed operative position.

Arranged on the stationary base are two or more suitably strong arched springs 6, adapted to be compressed by the depression of the throwing-plate 3 and released upon disengaging of the lever-arms from the slotted extensions 4, whereupon said plate 3 is strongly pushed upward and somewhat rotated on the connecting-springs 2.

Arranged on the upper side of the throwing-plate, and preferably near the free end portion thereof, are four or more vertical supporting-standards 7, provided at their ends with horizontally-rotatable flat hooks 8, adapted to receive rings 9 of a suitable corset fitted around the body of the animal to be thrown, Fig. 3.

The operation is as follows: The throwing-plate 3 being depressed and secured on the base through the agency of the lever 5, the animal—*i.e.*, a horse fitted with a suitable corset—is brought between the standards 7 and the rings 9 of said corset are hooked over the hooks 8 thereof, whereupon the corset is closely tied on the horse, so that the same is nearly hanging on the standards, but has its feet still contacting with the base 1; otherwise the animal would cling by the legs, which would be objectionable. Upon releasing the throwing-plate 3 through the agency of the handle-lever 5, the arched springs 6 will push said plate, with the animal thereon, upwardly, and by virtue of the *vis viva* and the partial rotation of the throwing-plate the animal will be caused to turn in the space and perform a so-called "*salto mortale,*" the flat-shaped hooks 8 being readily disengaged from the retaining-rings of the corset.

I do not wish to limit myself to making stationary the rotation-axis of the throwing-plate.

I wish it to be understood that various modifications may be made in the structural performance of my invention without departing from the scope thereof.

Having fully described my invention, what I claim, and desire to secure by Letters Patent, is—

1. In an apparatus of the class described, the combination with a stationary base, and means thereon adapted to be compressed, of a movable throwing-plate, suitable connections between the latter and the base at one end thereof, a number of standards secured to the upper side of said plate, and flat rotatable hooks on the upper end of said standards, substantially as set forth.

2. In an apparatus of the class described, the combination with a stationary base, and means thereon adapted to be compressed, of a movable throwing-plate, spring connections between said plate and said base at one end thereof, a number of standards secured to the upper side of said plate and arranged to receive an animal between them, and flat horizontally-rotatable hooks on the free ends of said standards, substantially as set forth.

3. In an apparatus of the class described, the combination with a stationary base, and arched springs thereon, of a movable throwing-plate, springs hinging said plate and base together at one end thereof so that said arched springs may be compressed by the depression of said plate, a number of standards on the upper side of said plate, flat rotatable hooks on the free ends of said standards, and means for temporarily securing said throwing-plate in its depressed position, substantially as set forth.

In testimony whereof I have signed this specification in the presence of two subscribing witnesses.

EDWARD WULFF.

Witnesses:
RUDOLPH FRICKE,
B. H. WARNER, Jr.